United States Patent [19]

Reed et al.

[11] Patent Number: 5,119,972
[45] Date of Patent: Jun. 9, 1992

[54] CONTAINER FOR SUPPLYING AGRICULTURAL TREATMENT AGENTS IN A CLOSED APPLICATION SYSTEM

[75] Inventors: David Reed, Nutley, N.J.; Frank D. Tenne, Ivyland, Pa.; Patrick D. Holverson, Ahwatukee, Ariz.; Jeffrey A. Hoffman, Westerville, Ohio

[73] Assignee: American Cyanamid Company, Stamford, Conn.

[21] Appl. No.: 458,332

[22] Filed: Dec. 28, 1989

[51] Int. Cl.⁵ .............................................. B67D 5/60
[52] U.S. Cl. ................................. 222/143; 206/509; 206/511; 215/10; 222/466
[58] Field of Search ............... 222/143, 466; 215/10, 215/100 A; 206/505, 507, 509, 511, 512, 504, 506, 503

[56] References Cited

U.S. PATENT DOCUMENTS

| | | | |
|---|---|---|---|
| 266,906 | 10/1882 | Sherwood | 206/509 X |
| 526,940 | 10/1894 | Pettit et al. | 206/509 X |
| 2,631,747 | 3/1953 | Stolte | 215/10 |
| 2,641,374 | 6/1953 | Der Yuen | 215/10 |
| 2,960,248 | 11/1960 | Kuhlman | 215/10 |
| 3,387,749 | 6/1968 | Godshalk et al. | 215/10 X |
| 3,406,874 | 10/1968 | Szajna | 222/143 |
| 3,587,904 | 6/1971 | Harris et al. | 206/509 X |
| 4,485,924 | 12/1984 | Ripoll et al. | 206/511 |

FOREIGN PATENT DOCUMENTS 967741 8/1964 United Kingdom ................ 206/509

*Primary Examiner*—Donald T. Hajec
*Attorney, Agent, or Firm*—Mark P. Stone

[57] ABSTRACT

The present invention provides a container for use in a closed application system for liquid or granular agricultural treatment agents. The agent is introduced into the container through an inlet opening on the upper surface of the container. Thereafter, a valve is removably mounted to seal the inlet opening and prevent inadvertant discharge of the liquid from the container. Hand grips are provided to manipulate the container, and the container is configured so that it nested or stacked on other similar containers having valves extending from the respective inlet openings when the containers are transported in an upright position. The handgrips are also employed to mount the containers in an inverted position in agricultural application equipment. Empty containers may be transported back to a supply station for refilling with the valves of the respective containers still mounted in the inlet openings to seal the openings and prevent inadvertant discharge or leakage of residue liquid or granular treatment agents still remaining in the containers. The reusable containers enable the agricultural treatment agents to be transported between a supply station and application equipment without any direct exposure to the user.

15 Claims, 2 Drawing Sheets

CONTAINER FOR SUPPLYING AGRICULTURAL TREATMENT AGENTS IN A CLOSED APPLICATION SYSTEM

BACKGROUND OF THE INVENTION

The present invention relates to containers for liquid or granular agricultural treatment agents, and in particular, containers for transporting agricultural treatment agents from a supply station to agricultural application equipment. More specifically, the present invention is directed to a reusable container for providing agricultural treatment agents in a closed application system in which direct exposure of the user to the agents is avoided.

In many instances, it is desirable for agricultural workers not to directly handle certain treatment agents, such as powerful herbicides, pesticides or fertilizers. Agricultural treatment agents generally are delivered to agricultural workers in sealed containers which must be opened to supply the treatment agents into application equipment on agricultural vehicles intended to dispense the treatment agents. During this procedure, agricultural workers may be directly exposed to the treatment agents. Moreover, when the agents are dispensed from the containers, the empty containers must be removed or otherwise handled, thereby further subjecting agricultural workers to possible direct contact or exposure with the agents through leakage of residue liquid or granular material which may still remain in the container It is the primary object of the present invention to provide a container for agricultural treatment agents which avoids direct exposure to agricultural workers to the treatment agents during the transportation of the containers to and from agricultural application equipment. It is a further object of the invention to provide a reusable container for such agricultural treatment agents which may be readily transported in groups, and which may be easily installed and removed from agricultural application equipment. Other objects and advantages of the present invention will become apparent from the following discussion.

SUMMARY OF THE INVENTION

The present invention provides a container for transporting agricultural agents, either granular or liquid, from a supply station to agricultural application equipment. The container is formed from a durable plastic, and may be refilled and reused after its initial contents are expended. The container includes an inlet opening defined on its top surface. The inlet opening includes means for removably receiving a valve element, which is initially in a closed position to seal the inlet opening. After the container has been filled with the treatment agent at a supply station, the valve element is mounted over the inlet opening to seal the container and avoid leakage of the contents therein when the filled container is subsequently transported to the application equipment. The valve element received in the inlet opening extends above the upper surface of the container, and the bottom surface of the container defines a recessed area complementing the configuration of the inlet opening with the extended valve element received therein. In this manner, a plurality of containers may be stacked or nested on each other and transported in an upright position with the sealing valve elements received in the respective inlet openings. Each container includes hand grips defined on at least two opposed sides to enable easy manual manipulation of the container in both an upright and inverted orientation.

DESCRIPTION OF THE BEST MODES FOR CARRYING OUT THE INVENTION

Figure 1:
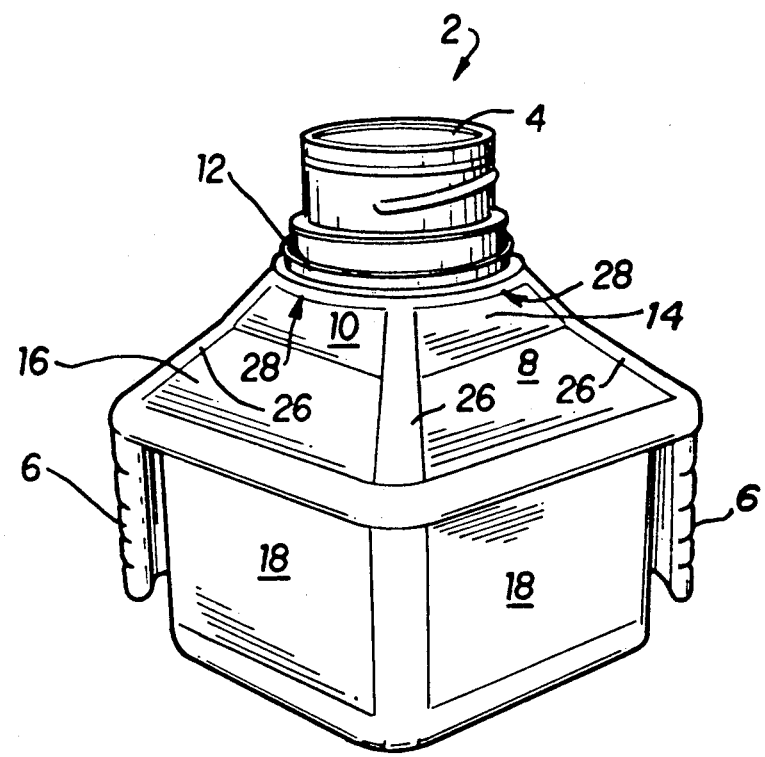
FIG. 1 of the drawing illustrates a perspective view of a container in accordance with the present invention as viewed from the side of the container.
Figure 2:
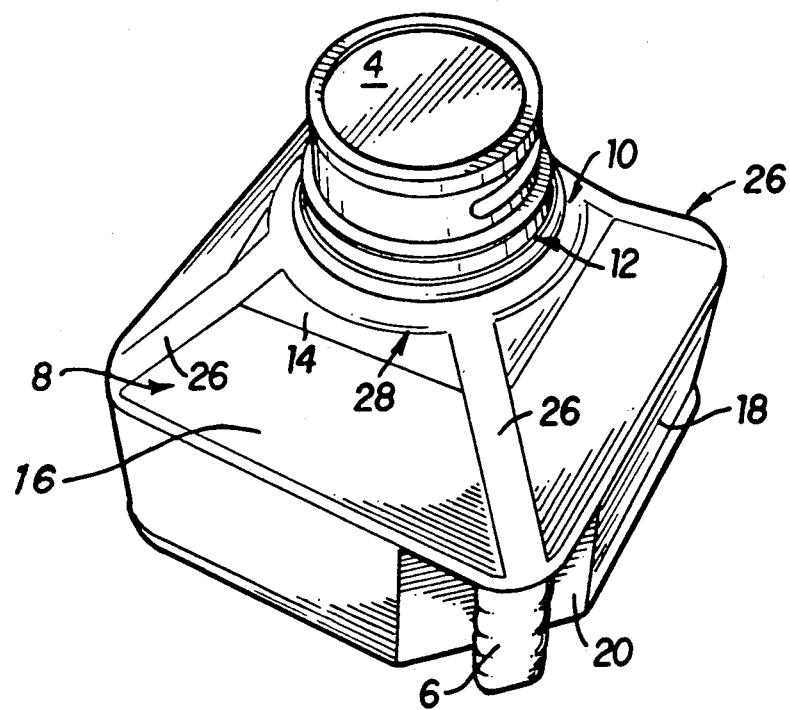
FIG. 2 of the drawing illustrates a perspective view of the container as viewed from above the container.
Figure 3:
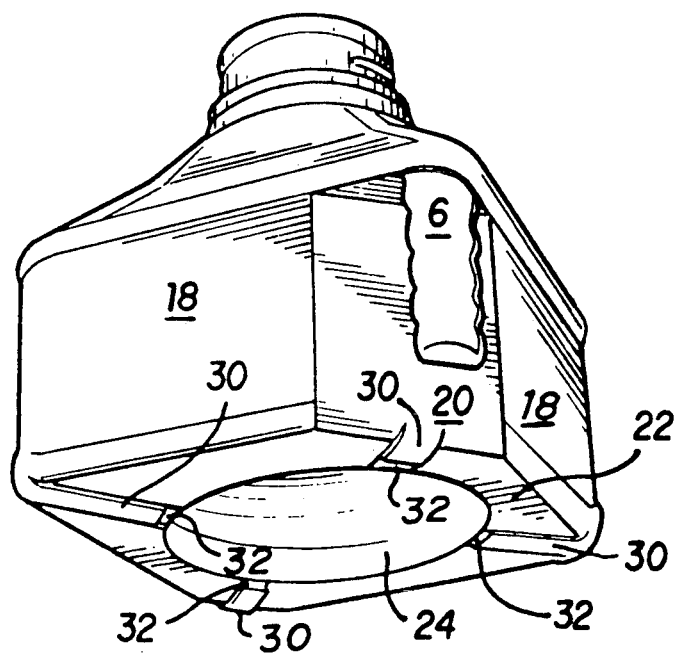
FIG. 3 of the drawing illustrates a perspective view of the container as viewed from below the container.

A container in accordance with the present invention is illustrated by FIGS. 1-3 of the drawings. The container is generally designated by reference numeral 2 and a valve element 4 (which does not form part of the present invention) is illustrated as being removable received within a centrally disposed inlet opening defined on the top surface of the container.

The container is formed from a durable plastic material, preferably by molding, and is intended to carry granular or liquid agricultural treatment agents. The container is reusable and may be filled at a supply station, transported to and installed within agricultural application equipment, and thereafter transported back to the supply station for refilling and reuse.

As illustrated in FIGS. 1-3, the container 2 is generally square shaped and includes two hand grips 6 integrally defined thereon. The handgrips 6 are disposed at two opposed corners of the container to enable a use to transport the container by lifting the opposed handgrips.

The container includes an upper surface generally designated by the reference numeral 8 which tapers upwardly toward the center area to define a centrally disposed, raised inlet/outlet nozzle 10 terminating in an opening 12. The more centrally disposed portion 14 of the upper surface 8 is inclined at a steeper angle than the peripheral portion 16 of the upper surface 8 to define the nozzle 10. The valve element 4 removably received in the nozzle 10 extends upwardly above the inlet/outlet opening 12 to seal the container 2. Preferably, the inner surface of the nozzle is threaded for removably mounting the valve element therein.

The container includes four sidewalls 18, which are oriented perpendicularly to one another, and further includes two inclined sidewalls 20 at opposed corners of the container for integrally defining and accommodating the opposed handgrips 6.

The bottom surface of the container is generally designated by the reference numeral 22, and defines a central indentation 24. The central indentation is defined and configured to receive both the nozzle 10 and the extended valve 4 of another similar container so that one or more containers may be stacked or nested on each other in an upright position.

Referring again to the upper surface 8 of the container 2, a plurality of radially oriented raised ribs 26 are defined to extend between the corners of the container and the nozzle region 10. These radially extending ribs merge with circumferential rings 28 defined around the inlet/outlet opening 12. The bottom surface 22 of the container also includes a plurality of raised ribs 30 which are radially oriented and extend substantially from the periphery of the indented portion 24 toward the outer side surfaces of the container. The ribs 30 merge with indented or depressed regions 32 defined proximate to the outer circumference of the indentation 24.

The ribs 30 and depressed regions 32 on the bottom surface of the container correspond to the radially oriented raised ribs 26 defined on the top surface of the container. Accordingly, when one container is stacked upon another, the raised ribs on the upper surface of the lower container are received in registration within the corresponding depressed regions 32 defined on the bottom surface of the upper container to provide stop means to prevent relative shifting movements between the stacked containers when the containers are being transported in this manner. The radially oriented raised ribs 30 defined on the bottom surface of the container 2 provides spacer elements between upper and lower stacked containers to facilitate the removal of one container from another.

In operation of the invention, the valve element 4 is removed from the inlet opening 12, and the container 2 is filled with granular or liquid agricultural treatment agent at a supply station. Thereafter, the valve is removably mounted to the nozzle 10 to seal the inlet opening 12. The sealed container is transported in an upright position to agricultural application equipment. As noted above, the container 2 is designed so that one or more similar containers may be stacked or nested atop each other for transporting a plurality of containers in an upright position with the respective valve elements extending above the inlet nozzles. The opposed handgrips integrally defined on each container enable the user to easily manipulate the containers for both stacking and unstacking.

When the containers are transported to the agricultural dispensing equipment, the containers are stored within the equipment in an inverted position. The handgrips enable the user to readily invert the respective containers for installation into the agricultural dispensing equipment. The valve element 4 continues to seal the inlet opening when the container is inverted and installed in the dispensing equipment. The dispensing equipment includes interface means which assure that the container and valve assembly are received and removed from the dispensing equipment with the valve in a sealed position. In this manner, the valve element continues to seal the inlet opening 12 during the removal of the container from the dispensing equipment to assure that there will be no leakage of any residue treatment liquid during the removal operation.

Once the container with the valve assembly is removed from the dispensing equipment, it is oriented in an upright position and returned to the supply station for refilling. The valve element continues to seal the filler opening 12 while the empty containers are returned to the supply station. A plurality of empty containers may be stacked or nested atop each other in an upright position during the return to the supply station. It is only at the supply station that the valve element 4 is removed from the inlet opening 12 to refill the containers.

It is apparent from the above discussion that the present invention provides means for conveniently and economically transporting one or more containers for granular or liquid agricultural treatment agents between a supply station and agricultural dispensing equipment in a manner which avoids direct contact between the user and the agents. The containers are designed to be reusable and are particularly adapted for use in a closed system for applying agricultural treatment agents.

Other advantages, modifications, and variations of the invention will become apparent to those skilled in the art. Accordingly, the discussion of the preferred embodiment herein is intended to be illustrative only, and not restrictive of the scope of the invention, that scope being defined by the following claims in all equivalents thereto.

We claim:

1. A container for a closed system for applying agricultural treatment agents, said container comprising:
   - a top surface, a bottom surface and a plurality of side walls disposed between said top and bottom surfaces, said top surface further including at least one raised rib defined thereon,
   - said top surface defining an opening having means for removably mounting a valve element for sealing said opening,
   - said bottom surface defining an indented area complementing the configuration of said top surface with said valve element extending from said opening in said top surface, said bottom surface further including at least one depressed region defined therein, said depressed region complementing said at least one raised rib and oriented such that said at least one raised rib is received in said depressed region when one of said containers is stacked atop another of said containers,
   - said bottom surface of said container defining at least one downwardly extending rib, said at least one downwardly extending rib acting as a spacer element between a plurality of said containers stacked atop one another,
   - wherein a plurality of said containers with said valve elements mounted thereon are stackable atop one another.

2. The container as claimed in claim 1 wherein said top surface of said container defines a nozzle around said opening.

3. The container as claimed in claim 2 wherein said indented area on said bottom surface of said container complements said nozzle defined on said top surface.

4. The container as claimed in claim 3 wherein said nozzle is defined in the center of said top surface of said container.

5. The container as claimed in claim 1 further including at least two hand grips extending from said sidewalls of said container.

6. The container as claimed in claim 5 wherein said hand grips are integrally attached to said container.

7. The container as claimed in claim 1 wherein said at least one raised rib received in said depressed region prevents relative movement between said stacked containers.

8. The container as claimed in claim 7 further including a plurality of said raised ribs defined on said top surface of said container and a plurality of said complementary depressed regions defined on said bottom surface of said container, said raised ribs and said depressed regions being oriented such that each of said ribs is received in a different one of said depressed regions when a plurality of said containers are stacked atop each other.

9. The container as claimed in claim 8 wherein said plurality of raised ribs are radially oriented on said top surface of said container.

10. The container as claimed in claim 8 wherein said depressed regions on said bottom surface of said container are defined proximate to the periphery of said indented area.

11. The container as claimed in claim 1 wherein said rib defined on said bottom surface of said container extends substantially between the periphery of said indented area and the periphery of said bottom surface of said container.

12. A container for a closed system for applying agricultural treatment agents, said container comprising:
   a top surface defining a nozzle opening therein, said nozzle including means for removably mounting a valve extending from said nozzle opening in sealing relationship with said nozzle opening, said top surface further including at least one raised rib defined thereon,
   a bottom surface defining an indentation therein, said indentation complementing the configuration of said nozzle opening with said valve extending therefrom, said bottom surface further including at least one depressed area defined thereon, said depressed area being in registration with and complementing said at least one raised rib on said top surface of said container, said raised rib and said depressed area providing stop means for preventing relative movement between a plurality of said containers stacked upright on one another when said raised rib is received in said depressed area.
   said container adapted to be stacked upright on another one of said containers by interfitting said nozzle and said valve into said complementary indentation in the bottom surface of said another one of said containers, and
   at least one rib extending downwardly from bottom surface of said container for providing a vertical spacer between adjacent containers stacked upright on one another.

13. The container as claimed in claim 12 wherein said rib extending downwardly from said bottom surface extends radially outwardly from the periphery of said identation.

14. A container for a closed system for applying agricultural treatments agents, said container comprising:
   a top surface, a bottom surface and a plurality of sidewalls disposed between said top and bottom surfaces,
   said top surface defining an opening having means for removably mounting a valve element for sealing said opening,
   said bottom surface defining a substantially centrally located indented area complementing the configuration of said top surface with said valve element extending from said opening in said top surface,
   said bottom surface defining at least one depressed region extending from the periphery of said centrally defined indented area towards the periphery of said bottom surface of said container,
   at least one downwardly extending rib defined on said bottom surface of said container for providing a spacer element between a plurality of said containers stacked atop one another,
   said downwardly extending rib merging with said at least one depressed region extending outwardly from said periphery of said centrally defined indented area.

15. The container as claimed in claim 14 including a plurality of said depressed regions extending radially outwardly from said centrally defined indented area on said bottom surface of said container, each of said depressed regions merging with a different one of a plurality of said downwardly extending ribs defined on said bottom surface of said container.

* * * * *